United States Patent [19]

Büttiker

[11] 4,439,044
[45] Mar. 27, 1984

[54] SCREW MIXER

[75] Inventor: Urs Büttiker, Lostorf, Switzerland

[73] Assignee: Rolf Baumgartner AG, Oftringen, Switzerland

[21] Appl. No.: 497,143

[22] Filed: May 23, 1983

[30] Foreign Application Priority Data

Jun. 2, 1982 [CH] Switzerland ................ 3373/82

[51] Int. Cl.³ .................... B01F 7/00; B01F 13/10
[52] U.S. Cl. .................... 366/292; 366/241; 366/318
[58] Field of Search ........... 366/53, 279, 292, 295, 366/318, 319, 320, 321, 322, 323, 324, 196, 195, 241; 99/348

[56] References Cited

U.S. PATENT DOCUMENTS

| 546,473 | 9/1895 | Patton | 366/279 X |
| 3,334,575 | 8/1967 | Erwin | 99/348 |
| 3,937,444 | 2/1976 | Kapp | 366/318 X |

FOREIGN PATENT DOCUMENTS 281191 12/1964 Netherlands .............. 366/318

Primary Examiner—Philip R. Coe
Assistant Examiner—Frankie L. Stinson
Attorney, Agent, or Firm—Werner W. Kleeman

[57] ABSTRACT

The screw or worm mixer comprises a downwardly tapering container and a conveying and mixing screw or worm arranged therein which does not move along the container wall. The container does not have a round cross-section but a substantially cornered cross-section and the screw is arranged in one corner thereof. This corner is rounded to form a curvature which is essentially concentrically arranged relative to the lengthwise axis of the screw. The entire container is pivotably supported so that, depending upon the requirements of the processed material, the container wall which is adjacent to the screw or worm and forms a segment of a cylinder is located somewhat below, adjacent or above the screw. Due to such arrangement no relative movement between the screw and the container is necessary, which not only simplifies the construction but also enables further stirring or agitator units to be mounted at the container wall, thereby permitting a number of mixing operations to be performed in succession in the same mixer.

5 Claims, 4 Drawing Figures

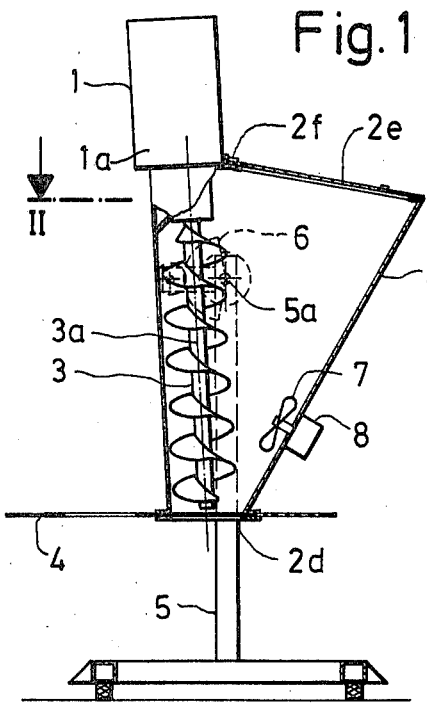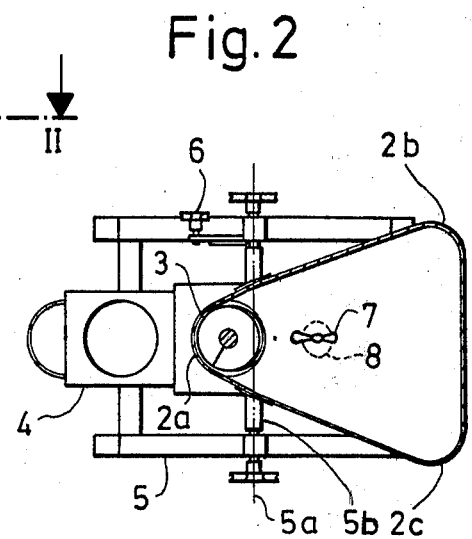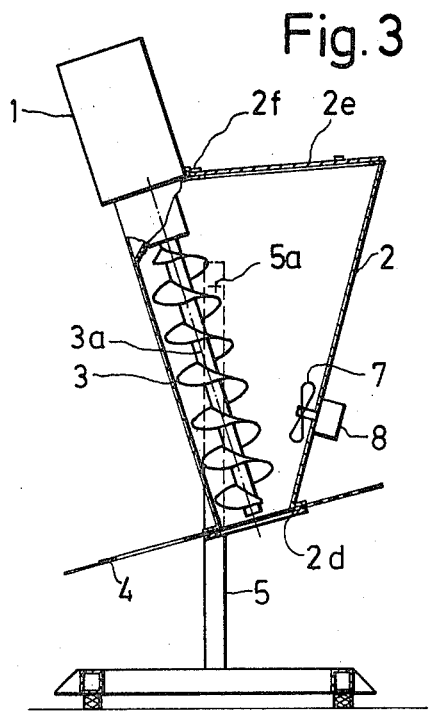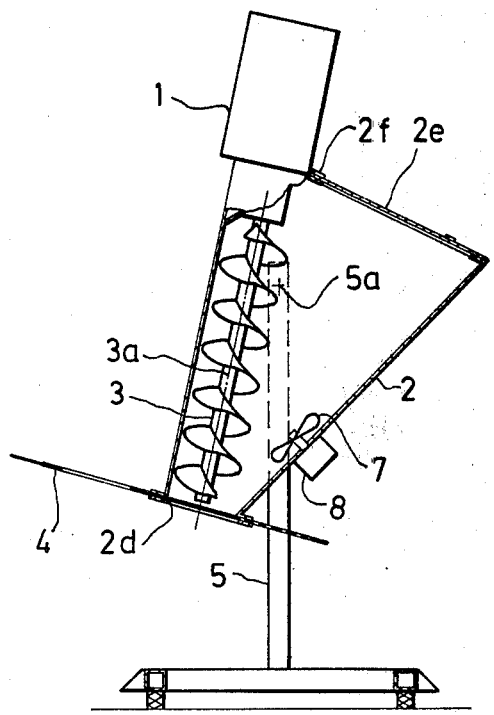

SCREW MIXER

BACKGROUND OF THE INVENTION

The present invention broadly relates to a new and improved construction of a screw or worm mixer, and, more specifically, relates to a new and improved screw or worm mixer comprising a downwardly tapering container or receptacle and a conveying and mixing screw or worm protruding from above into the container.

Conventional commercially available screw mixers comprise a downwardly tapering container possessing a circular frustro-conical shape and a conveying and mixing screw or worm protruding from above into the container. The screw is located close to the wall of the container and conveys the material to be mixed from the bottom towards the top. Such mixers are thus also called conical screw or worm mixers. Usually the screw or worm also performs a movement about the container axis in addition to a rotation about its own axis, whether such is because the screw is guided along the wall of the container or because that the container is rotated about its axis and the screw is stationary.

Such mixing apparatuses are therefore mechanically complicated, since in addition to the drive means for generating a rotational movement of the screw further drive means and supporting or bearing means are also required for the relative movement of the screw and the container.

SUMMARY OF THE INVENTION

Therefore, with the foregoing in mind it is a primary object of the present invention to provide a new and improved screw or worm mixer which is not afflicted with the aforementioned drawbacks and limitations heretofore discussed.

Another and more specific object of the present invention is directed to the provision of a new and improved screw or worm mixer which achieves a high mixing efficiency without requiring any relative movement between the mixing screw or worm and the container.

Now in order to implement these and still further objects of the invention, which will become more readily apparent as the description proceeds, the screw or worm mixer of the present development is manifested by the features that, the cross-sections of the container normally or perpendicular to the screw axis form triangles with rounded corners. The screw or worm is arranged in one corner and this corner is rounded such that the curved or arcuate-shaped portion of the container wall has a constant distance from the screw or worm over the entire height of the container. The container is mounted so as to be pivotable about an essentially horizontal axis such that upon pivoting or tilting of the container the screw axis is pivoted in an essentially vertical plane.

Depending upon whether the three planar or flat side surfaces of the container are trapezoidal or triangular the lower edge or margin of the container either comprises three arcuate portions interconnected by short straight or rectilinear sections or a circular line or arc extending concentrically with respect to the lengthwise axis of the screw or worm.

It is a further appreciable advantage of the screw mixer according to the invention, in which no relative movement is required between the screw and the container, that the container can be provided with a stirring or agitator unit arranged at the container wall. This is, of course, impossible in conventional screw or worm mixers in which the screw or worm is moved along the entire container wall.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a vertical sectional view through a screw or worm mixer constructed according to the present invention;

FIG. 2 is a horizontal sectional view taken essentially along the line II—II of the screw mixer shown in FIG. 1; and FIGS. 3 and 4 each show a vertical sectional view through the screw mixer shown in FIG. 1, the container being shown pivoted to the left in FIG. 3 and to the right in FIG. 4.

DETAILED DESCRIPTION OF THE PREFERRED EMBODIMENTS

Describing now the drawings, it is to be understood that only enough of the construction of the screw or worm mixer has been shown as needed for those skilled in the art to readily understand the underlying principles and concepts of the present development, while simplifying the showing of the drawings. Turning attention now specifically to FIG. 1, there has been schematically illustrated therein in vertical section a container or receptacle which is generally designated in its entirety by reference numeral 2. Within the container 2 there is rotatably arranged a conveying and mixing screw or worm, generally designated by reference character 3, as is usual for such screw or worm mixers. The screw 3 is mounted in a drive motor housing 1 which is arranged outside and on top of the container 2. Advantageously, the drive motor, generally indicated by reference character 1a, is a motor rotatable at variable rotational speeds or a motor provided with a transmission or gearing unit possessing a continuously variable transmission or gear ratio. The container or receptacle 2 has a cross-section which is particularly evident from FIG. 2. Viewed normally or perpendicular to the axis 3a of the screw 3, the container cross-section forms a triangle with rounded corners. The screw or worm 3 is arranged in one of these corners and this corner is rounded such that the curved or arcuate-shaped portion 2a of the container wall has a constant distance or spacing from the screw 3. In other words, the curved portion 2a of the container forms a cylinder segment. Since the two other corner sections or portions 2b and 2c are similarly designed the surfaces formed therebetween are planar trapezoids or triangles. In the illustrated embodiment the surfaces are tirangles, so that the lower container margin or edge 2d has the shape of a circular line or arc extending concentrically with respect to the screw or worm axis 3a. This lower margin or edge can be provided with any kind of known closure member like, for example, a slide plate 4.

At the top or upper region the container 2 is advantageously covered by a suitable cover member 2e which is hingedly connected to the container 2 by means of a hinge-joint or hinge 2f and which may be provided with any kind of known locking means in order to fixedly retain the cover or cover member 2e in the closed position.

The container 2 is suspended or mounted at a stand or frame unit 5 so as to be pivotably supported by means of the pivot shafts 5b for pivotal or tilting movements about a horizontal axis 5a such that the screw or worm axis 3a is pivoted in a substantially vertical plane upon pivoting the container 2. Any suitable fastening or fixing means 6, such as a conventional clamping or locking device, serve to fix the container 2 in any desired tilted position.

As will be seen from FIGS. 1 and 2, the container 2 is additionally provided with a stirring or agitator unit which, in the particular case, is formed by a dissolver disk 7 arranged in the interior of the container 2 and by a drive unit 8 placed on the outside of the container 2.

Multistep mixing operations may be performed in screw mixers provided with such additional stirring unit: thus, for example, a salad dressing comprising different liquids and spices can be prepared employing the additional stirring unit if designed as a dissolver; after introducing, for instance, celery, carrots or potatoes such solid materials can be intimately mixed with the dressing by means of the mixing screw or worm without disintegrating the solid materials. The pivoted or tilted position of the container 2 is selected in accordance with the nature and the sensitivity, as the case may be, of the material to be mixed. FIG. 1 shows a central or intermediate position. In case that the material to be processed or mixed would suffer in this position of the container 2, then the container 2 will be pivoted into such a position as shown in FIG. 4 in which products can be mixed which require the highest possible careful or protective treatment; however, it should be noted that in this case the mixing treatment will require somewhat more time than for the adjustment shown in FIG. 1. If the material to be mixed, however, does not specifically require any particular processing intensity, then the position of the container 2 as shown in FIG. 3 can be readily selected, wherein the mixing operation can be much more intensely performed, so that a shorter mixing time can be utilized. The position of the container 2 thus will be selected according to the requirements of the material to be processed and it is readily possible to optimize the mixing operation by accomplishing a correct selection of the rotational speed of the mixing and conveying screw.

While there are shown and described present preferred embodiments of the invention, it is to be distinctly understood that the invention is not limited thereto, but may be otherwise variously embodied and practiced within the scope of the following claims. Accordingly,

What I claim is:

1. A screw mixer comprising:
   a downwardly tapering container having container walls;
   a conveying and mixing screw defining a screw axis and protruding into said container from above;
   said container forming substantially triangular cross-sections with rounded corners in planes extending normally relative to said screw axis of said screw;
   said screw being arranged in one of said corners;
   said container defining a height and a wall including said rounded corners;
   said container wall, at the region of said corner in which said screw is arranged, forming a curved section extending essentially over the entire height of said container at an essentially constant distance from said screw; and
   means for mounting said container for pivotal movement about a substantially horizontal axis such that said screw is pivoted in a substantially vertical plane when said container is pivoted.

2. The screw mixer as defined in claim 1, wherein:
   said container forms a lower margin; and
   said lower margin of the container comprising a circular line extending substantially concentrically relative to said screw axis of said screw.

3. The screw mixer as defined in claim 1, further including:
   fastening means for fixing said pivotable container in any desired pivoted position.

4. The screw mixer as defined in claim 1, further including:
   stirring means provided for said container.

5. The screw mixer as defined in claim 4, wherein:
   said stirring means comprises a dissolver disk arranged in the interior of the container and a drive unit arranged outside of said container.

* * * * *